INVENTORS.
LAUREN G. KILMER
M.C. LIVELY

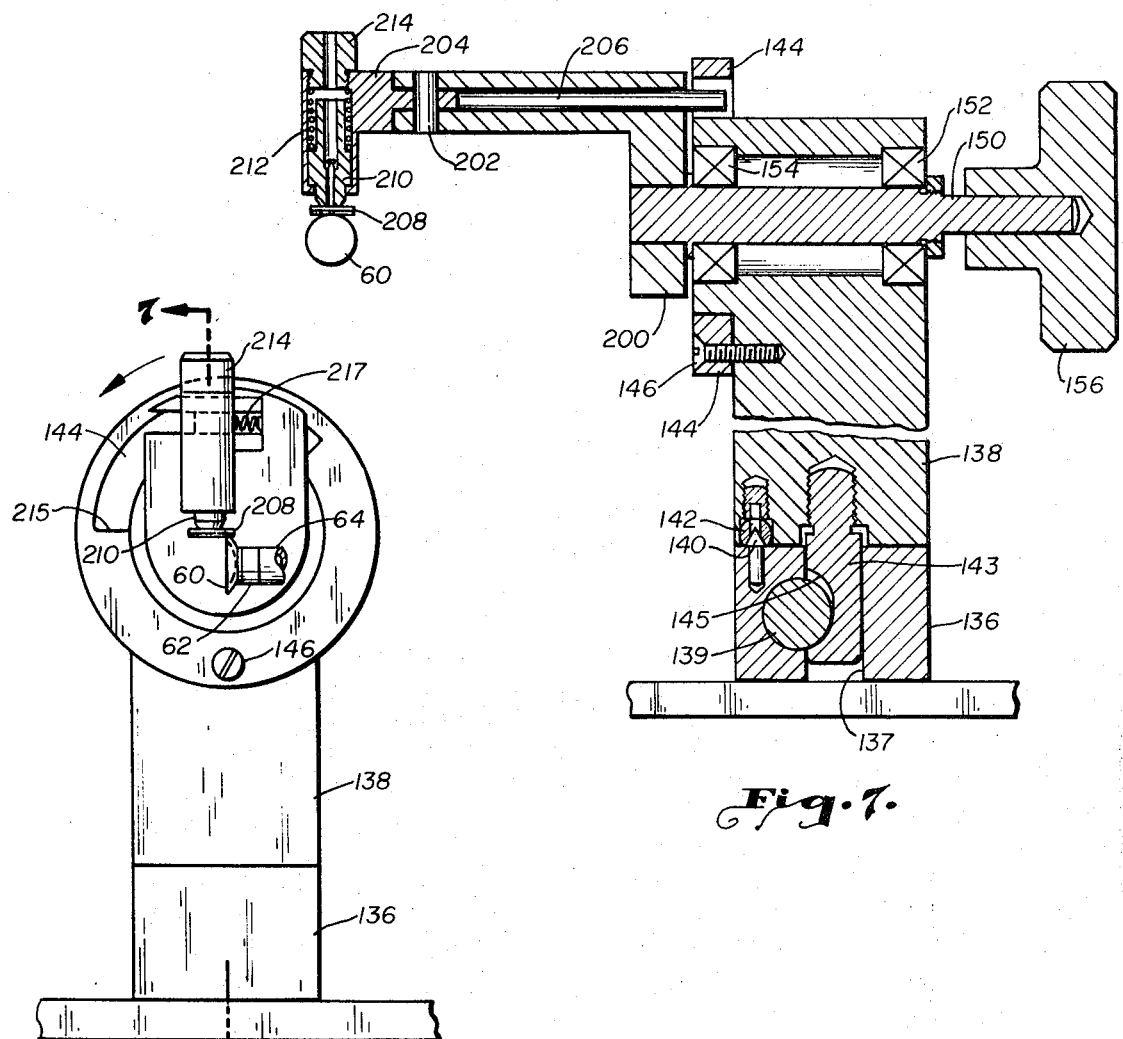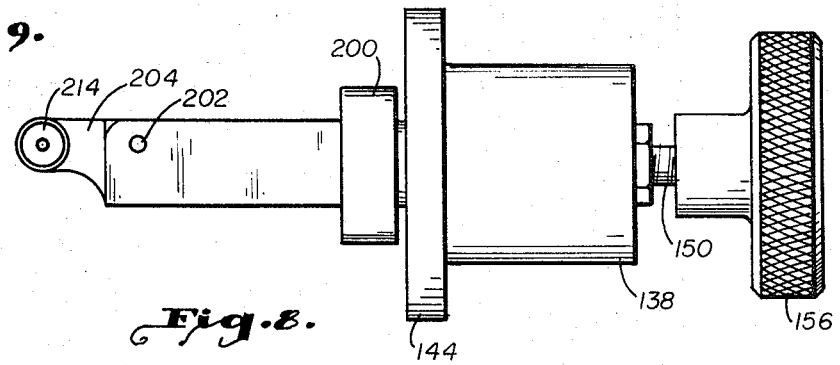

BY

Head & Johnson

ATTORNEYS

United States Patent Office 3,528,326
Patented Sept. 15, 1970

3,528,326
CONTACT LENS EDGING APPARATUS
Lauren G. Kilmer, 1927 E. 35th Place 74105, and McCabe C. Lively, 2667 S. Winston 74114, both of Tulsa, Okla.
Filed Aug. 30, 1967, Ser. No. 664,544
Int. Cl. B23b 3/28
U.S. Cl. 82—14                       9 Claims

ABSTRACT OF THE DISCLOSURE

A contact lens edging and polishing apparatus include a lens holding and centering mechanism which is rotatable relative to an edge cutting and/or polishing tool. The tool is caused to follow a fixed path in a semi-generation process. The edge of the lens and the tool are projected upon a comparator screen in order that the operator may know the relationship of the lens edge to the cutting or polishing tool.

BACKGROUND OF THE DISCLOSURE

Prior artisans such as G. H. Butterfield Pat. No. 2,544,246 and K. N. Tuohy Pat. No. 2,510,438 and J. J. Hornstein in Pat. No. 2,809,556 have considered that the irritating effect of contact lenses is corrected by a proper design of the inner curvature of the lens so that it would preferably be truly parallel to the curve of the cornea. However it is recognized that the cornea of the eye is not truly spherical from edge to edge in many, if not all, cases but is spherical only at the central portion or pupil of approximately five to ten millimeters in diameter. From this portion the radius of the cornea flattens or increases outwardly toward the limbal area.

It has been found that the comfort and ability to successfully wear plastic contact lenses is largely a function of the shape of the outer peripheral edge of the lens. If the edges of the lenses rest upon or contact the limbus, the free circulation of tear or lachrymal fluids is hindered plus inability to obtain oxygen from the atmosphere. As a result there is irritation or in some instances veiling and fogging of vision and in many cases a refusal by persons to wear contact lenses or the wearing time becomes greatly limited. In some of the prior contact lens art the radius of contact lens has been made flatter than the curve of the cornea and hence with sufficient contour to clear the limbal area whereby the inner center of the contact lens is to rest on the apex of the cornea. In other and preferred instances the lens is shaped in the inner radius so that the marginal area of the lens follows substantially the radius of the corneal peripheral area. However, the prior art has not considered sufficiently the shape and particularly the means to form the inner to outer marginal and peripheral edge of contact lenses as a source of irritant shortening a person's wearing time. In addition heretofore, the cutting or grinding and polishing of the edge has been largely a hand process without control. B. R. Morris in Pat. No. 3,301,105 disclosed a method and apparatus for shaping the edge of contact lenses similar to a lathe operation. However, the shape desired is derived from a rectilinear moving apparatus requiring a specially shaped cutting tool.

Because of this, movement of the cutting tool from the interior marginal edge, around the peripheral edge to the exterior marginal edge is not possible, nor taught, as a relative singular motion. In addition, the rectilinear motion of the cutting tool and the image are in conflict with the actual orientation of the lens and cutting tool.

SUMMARY OF THE INVENTION

Accordingly this invention has for its object the provision of a contact lens edge shape and design which extends from the inner surface around the edge to the outer surface and to apparatus for forming and polishing that shape which is believed to overcome the objections to prior art devices and to overcome one source of irritant and objection to wearing contact lenses.

Another object of this invention is to provide a contact lens edge peripheral edge shape and apparatus for forming and polishing same which includes unique means for holding, centering and rotating the lens and further provide unique means for carefully grinding, forming and polishing the edge thereof.

A further object of this invention is to provide a means for holding the edging tool on a tool block to obtain extreme accuracy required for a replaceable tool and yet permit adjustment.

Another important object of this invention is to provide apparatus for forming a desired and novel edge on contact lenses by generating the edge shape, rather than turning of the edge by a design of form tool, yet produce said shape with such precision that all portions of the edge have the same radius and shape.

A yet further object of this invention is to provide an optical viewing system wherein the lens edge and cutting tool are oriented in their natural physical condition without reversal of movement.

Another object of this invention is to provide an apparatus for cutting and/or polishing the marginal and peripheral edge of contact lenses which permits quick lens changing, quick cutting and conversion to polishing operations that allows repetitive mass production of contact lens.

These and other objects of this invention will become more apparent upon further reading of the specification, claims and drawings submitted herewith.

BRIEF DESCRIPTION OF THE DRAWINGS

FIG. 7 is a sectional view of the polishing tool sub-assembly.

FIG. 8 is a top elevational view of the polishing head sub-assembly.

FIG. 9 is an end elevational view of the polishing head sub-assembly.

DESCRIPTION OF THE PREFERRED EMBODIMENTS

Figure 1:
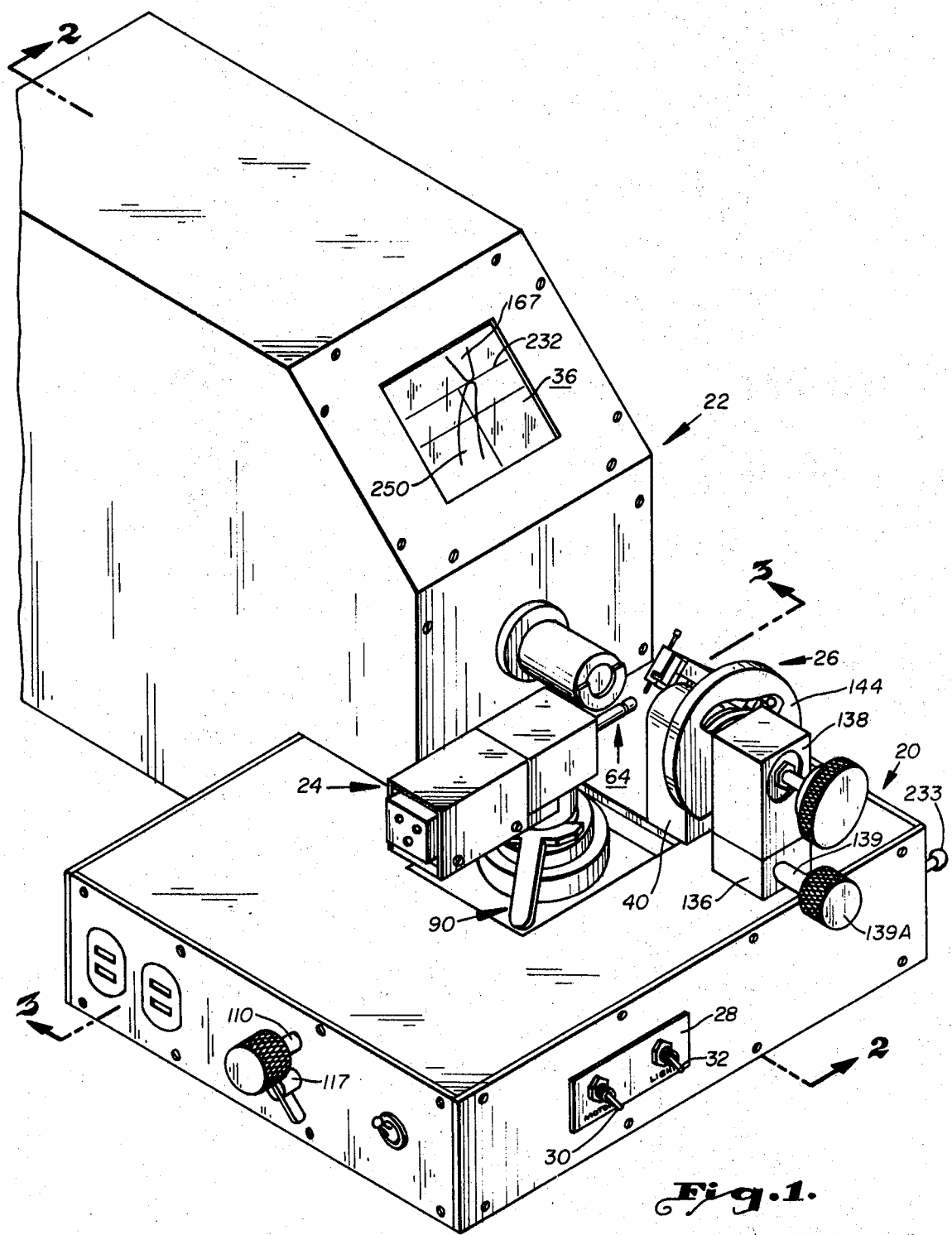
FIG. 1 is a perspective view of the lens edger and polisher of this invention.

Referring now to FIG. 1, the basic apparatus of this invention is described and includes, generally speaking, a base housing 20 to which is connected the viewing assembly 22, the drive assembly 24 and the cutting tool generation device and assembly 26. A suitable switch plate 28 is provided for switches 30 and 32 for the lens holding and rotational drive assembly 24 and for the comparator lamp and shadow projection system 22.

SHADOW PROJECTION SYSTEM

Figure 2:
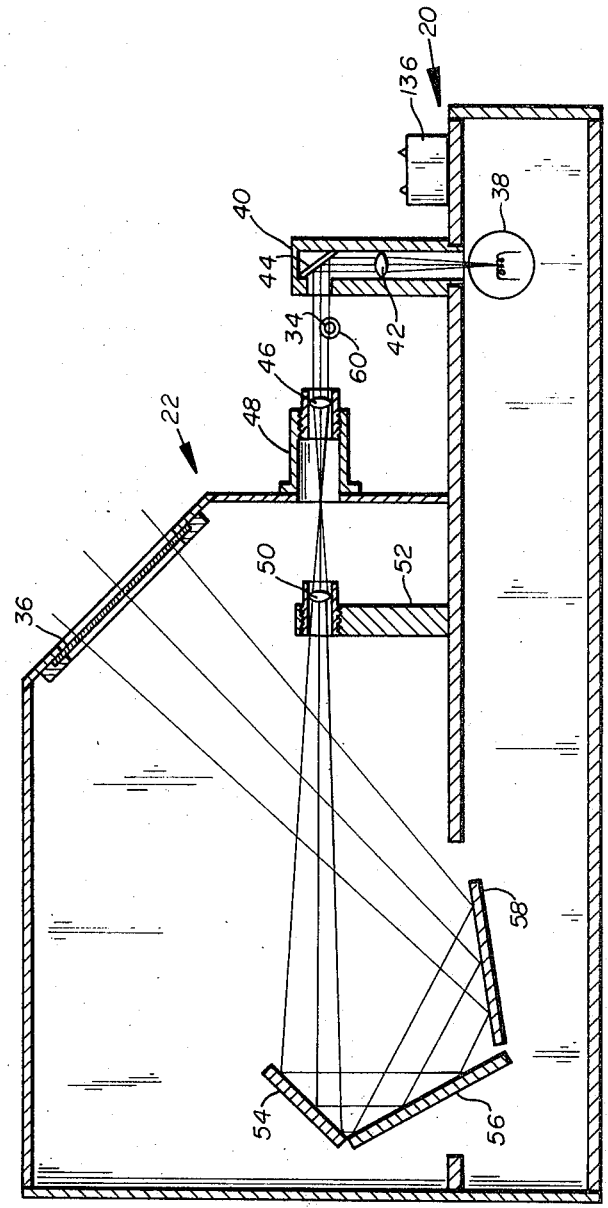
FIG. 2 is a sectional view taken along the line 2—2 of FIG. 1.

Referring now to FIG. 2, the shadow projection system is oriented relative to the motor shaft 34 or lens 60 such that the edge shadow of the lens and the cutting tool are projected onto a screen 36. A projector lamp 38 is supported, not shown, within the base housing 20 so as to cause light rays to pass upwardly through an opening in a capstan 40 wherein the rays are condensed by lens 42 and reflected by a mirror 44 so as to pass the light rays, preferably above the horizontal center line of the motor shaft 34 and to project a shadow of the upper half of the rotating lens and the cutting tool to the screen 36. The light rays are focused by lens 46 which is supported within an adjustable front holder 48. The light rays thereafter are projected and reversed by lens 50 which is retained within holder 52 and are then reflected by successive mirrors 54, 56 and 58, to project the shadow image upon screen 36 in the direct and natural physical orientation of the rotating lens and cutting tool which are projected thereon. The screen 36 may include a graphic overlay of the desired lens shape for comparison and measuring purposes, the lens 60 being orientatable relative to the graphic outline on the screen 36 by the assembly 24 hereinafter described.

LENS HOLDER AND DRIVE ASSEMBLY

Figure 3:
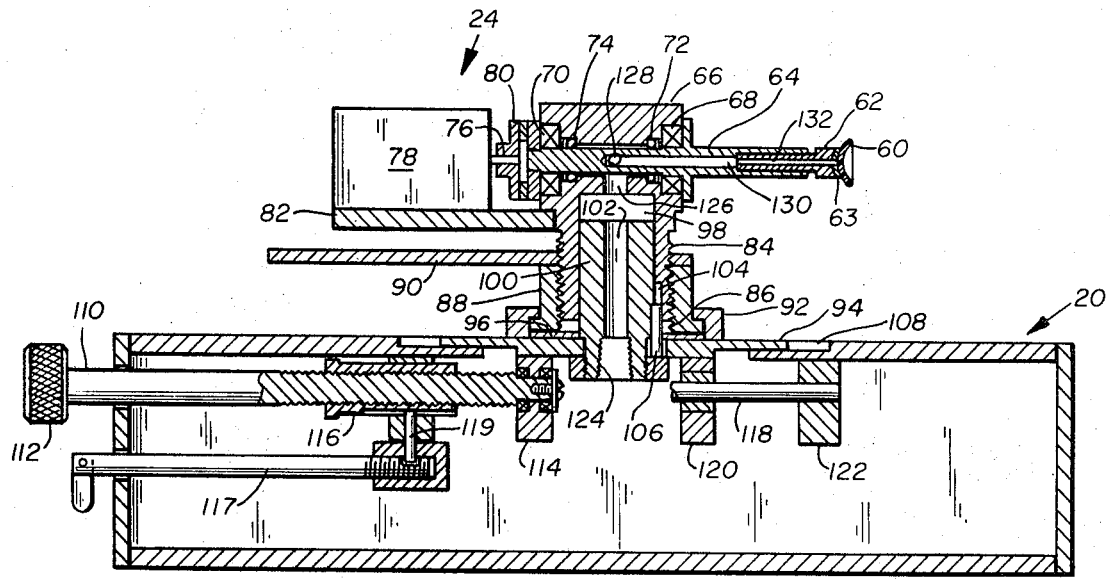
FIG. 3 is a sectional view taken along the line 3—3 of FIG. 1.

Referring now to FIG. 3, the lens holding and rotational drive assembly 24 is best described. Contact lens 60 is adapted to be retained by air pressure differential, hereinafter described, upon a lens chuck 62 with a soft resilient face 63. By reason of the taper of chuck 62 it is retained within spindle 64. The spindle is rotatably supported upon a bearing block 66 by bearings 68 and 70. Seal rings 72 and 74 prevent vacuum leakage as heretofore described. Spindle 64 is attached to motor shaft 76 of motor 78 by a coupling 80, for example as an Oldham type coupling. The motor is supported upon a base 82 which is attached as a part of bearing block 66. The bearing block includes at its lower portion, screw threads 84 which are in engagement with matching threads 86 of height adjusting nut 88. A height adjusting lever 90 is affixed to the nut 88 to cause the rotation thereof relative to bearing block 66. A retainer 92 is attached to the base plate 94 of assembly 20 and includes a bearing washer 96 upon which the height adjusting nut 88 rides. Attached to the base plate 94 and centrally oriented relative to opening 98 of the bearing block 66, is a centralizing support member 100 which has a conduit 102 therein for interconnection with a vacuum causing means. A keyway 104 in the bearing block 66 is in cooperative engagement with a key member 106 rigidly affixed to the central member 100 wherein the relative motion of adjusting nut 88 prevents rotation of bearing block 66 for vertical height adjusting movement. Horizontal adjustment of base plate 94 is achieved within groove 108 formed as a part of the top base plate assembly 20. An adjusting screw 110 includes hand knob 112. The screw 110 is rotatively affixed to member 114 which is an extension of base plate 94. The adjusting screw 110 is adapted to be threadedly engaged with a sliding nut 116 which can be clamped to the base plate assembly 20. One or more, preferably two, guide rods are attached to base plate assembly 20 extension member 122 and adapted to slide within one or both of the movable extensions 120 and 114 which are a part of the base plate 94 of movable lens holding assembly 24. A vacuum hose connection 124 will provide communication to the conduit system 102, opening 98 in bearing block 66, opening 126, which leads into the space in the bearing block between seals 72 and 74. Further communication is provided thereafter along spindle 64 by way of openings 128 communicating with conduit 130 of the spindle and conduit 132 of the lens chuck 62. Also suitable electrical connection is made from switch 30 or 32 to motor 78.

CUTTING TOOL ASSEMBLY

Figure 4:
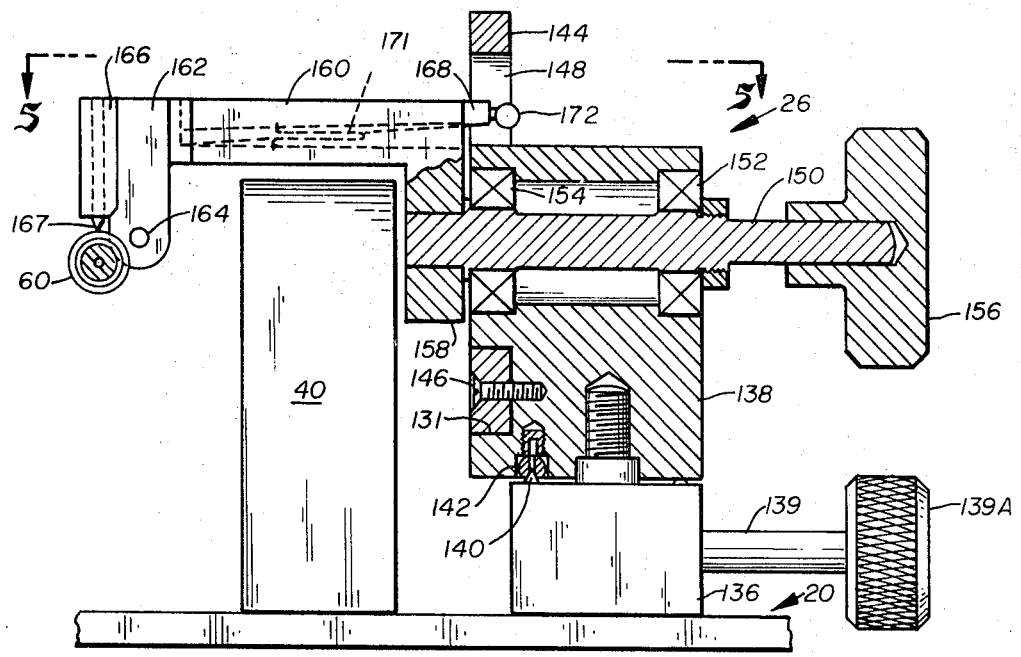
FIG. 4 is a sectional view of the cutting tool sub-assembly, partly in section.
Figure 5:
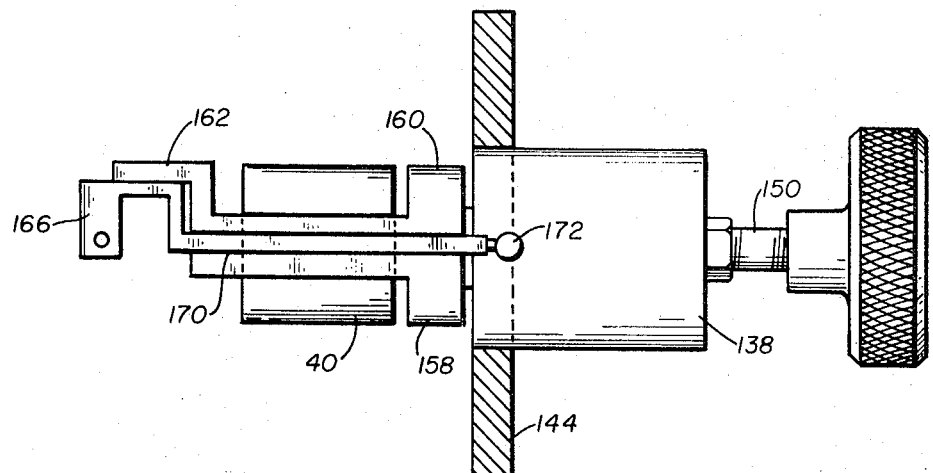
FIG. 5 is a top elevational view of the cutting tool sub-assembly generally taken along the lines 5—5 of FIG. 4.
Figure 6:
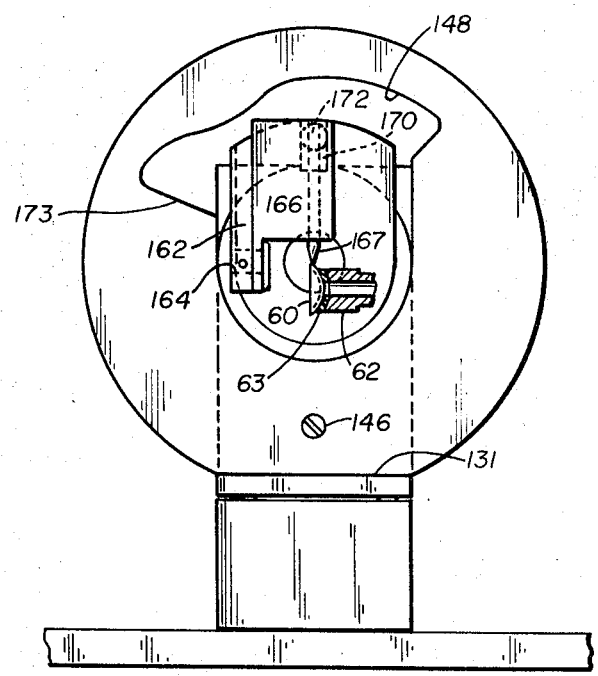
FIG. 6 is an end elevational view of the cutting tool sub-assembly.

Referring now to FIGS. 4, 5 and 6, the cutting tool assembly 26 is described. A mounting block 136 is supported upon the base plate assembly 20 to removably retain a tool head 138. A tripod arrangement of tool locating pins 140 are centered of and aligned within corresponding pads 142 formed in a similar triangular relationship within tool head 138. In all instances the interlock arrangement, described in FIG. 7, between mounting block 136 and tool head 138 is used. It is to be understood that in FIG. 7 base 136 is shown revolved 90° relative to tool head 138 for descriptive purposes herein. A cam member 144 is retained fixably to tool head 138 by slipping over projection 131 and/or other fastener. The cam surface 148 formed internally of member 144 is so positioned, located, and designated to provide the contact lens edge design which is a part of this invention. That is, the cutting tool hereafter described is caused to generate a designed lens shape extending along one side of the lens, around the edge, thence along the other side. A cutting tool shaft 150 is rotatably supported in tool head 138 by bearings 152 and 154. A hand tool rotating knob 156 is affixed at one end of shaft 150. Although the generation of the lens edge design is probably best accomplished by hand actuation of the cutting tool it is to be understood that other electrical or mechanical means are inclusive of this invention in lieu thereof. A tool head arm 158 is rigidly attached to shaft 150 for rotation therewith. Forwardly thereof and extending around and over capstan 40 is the arm portion 160 and head 162 which includes an opening 164 which extends transversely across the axis of tool rotating shaft 150. A tool holder 166 is pivotally supported about a shaft in opening 164 of the tool head portion 162 and includes arm 168 extending rearwardly and operates within a slot 170 of tool head arm 160. A spring 171, shown dotted, within slot 170 tends to normally bias arm 160 outwardly. A spherically shaped cam follower 172 is adapted to ride against the designed cam surface 148.

An important and critical feature of this invention is the relationship of the cutting tool 167 location relative to pivot point 164 and location of the contact point between sphere 172 and surface 148. Cutting tool tip 167 is on the same horizontal centerline of pivot 164 when follower sphere 172 is in its lowest position 173 (FIG. 6) there is very little lateral movement of tool 167 while follower 172 follows cam surface 148. This allows the generation and design of a cam which causes the tool to follow a prescribed shape. Further there is an exact ratio relationship between the lever arm of tool 167—pivot 164 and lever arm 168—follower 172 to the radius of tool tip 167 and radius of follower 172. This directly bears upon the lens radius resulting in the peripheral edge, which is hereinafter described relative to FIG. 10. Preferably the ratios are both 1:10 which provides a lens edge diameter of .003".

POLISHING HEAD

Referring now to FIGS. 7, 8 and 9, the polishing head embodiment is depicted. Where applicable, like parts noted heretofore will be given like numerals. As shown in this embodiment and also applicable to the embodiment of FIGS. 4, 5 and 6, an opening 137 is provided within the mounting block 136 centrally. A tool head clamp pin 143 which is attached to the tool head 138 is adapted to be insertable within opening 137 and by reason of shaft 139 within the mounting block 136 and recess 145 of the pin 143, the tool head assembly is maintained rigidly affixed upon its tripod pins 140. Shaft 139 is actually a cam attached to knob 139A. A polisher arm 200 is attached to tool rotating shaft 150. This arm extends forwardly and over the lamp capstan and reflection device, not shown in these views. At the forward end thereof is a pivot pin 202 within which the polishing head 204 is positioned for pivotal movement, when in the position shown in FIG. 7, in a horizontal direction around pin 202. A part of the polishing head 204 is follower pin 206 which extends within cam surface 144. In use and referring to FIG. 9 it is to be noted that when polisher member is rotated in the direction of the arrow pin 206 will strike shoulder 215 while the remainder of arm 200 continues a short distance. This retention causes pin 206 to pivot upwardly around pivot 202 against spring 217. This has the effect of shifting polishing lap 208 relative to lens 60 so that lap 208 can move into and down the exposed inner face and contour of lens 60. Forwardly of the polishing head, the polishing wheel 208 is supported within sleeve 210. The sleeve is biased by spring 212 to maintain the sleeve 210 normally towards the direction of the lens 60. Spring retaining member 214 is threadably attached to the polishing head 204. An enlarged alternate polishing head is described in FIG. 11. A detent spring 211 retains polishing wheel 208. It has been found that an effective polishing disc is end grain balsa wood which holds polish and water within its soft porous structure. However, other materials of like characteristics such as fabrics or plastics can be used as polishing laps.

Figure 11:
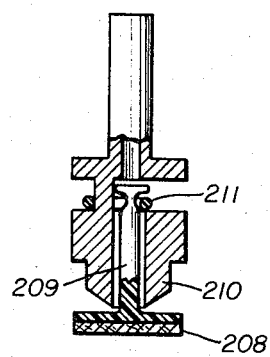
FIG. 11 is an enlarged partial sectional view of the polishing head.

As shown in FIG. 11 the lap shaft 209 includes a groove at the neck thereof which is rotatably retained by spring 211. This permits easy removal and replacement of the polishing lap 208.

The polisher head comprises a free running flat faced lap which bears against the lens edge under slight spring pressure and is driven in a skew fashion by the rotating lens function. The point of contact of lens to lap is such that the lap is caused to rotate in and of itself, hence presenting a sliding changing path to the lens as the lap is moved around the edge. The lap is preferably moved around the lens edge by hand, and does not depend upon operator sensitivity to determine either the pressure or the generated path.

Figure 12:
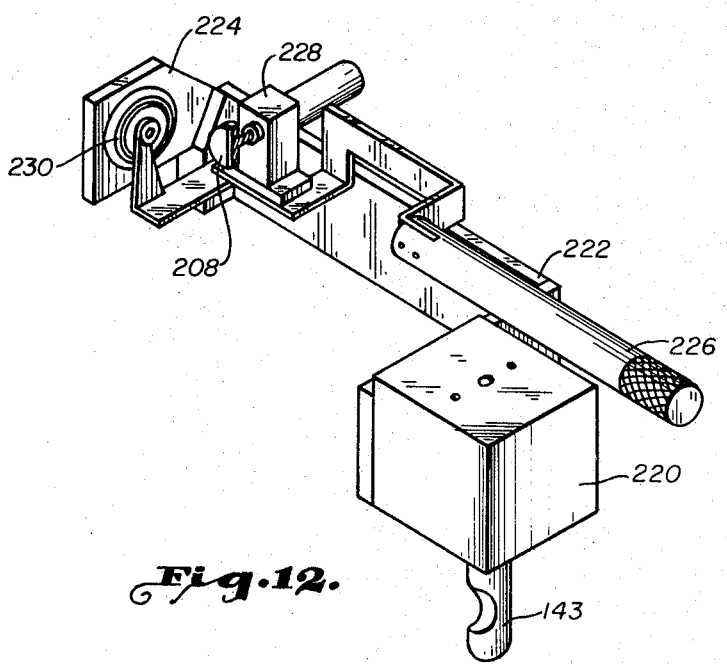
FIG. 12 is an alternate embodiment of polishing mechanism.

The alternate embodiment of FIG. 12 distinguishes over controlled lap path type shown in FIGS. 7, 8 and 9, in that greater latitude is granted the operator in the polishing operation. A tool head 220 includes a heretofore described clamp pin 143 for attachment to block 136 shown in other views. Arm 222 is attached to head 220 so as to extend around capstan 40 terminating inwardly by arm 224. Hand shaft 226 includes means 228 to retain, rotatably, polisher lap 208 and is pivotal in a semi-spherical socket and bearing mechanism 230. A central opening through element 230 allows light from the shadow projection system to pass through the bearing to the viewing screen.

LENS EDGE DESIGN

Figure 10:
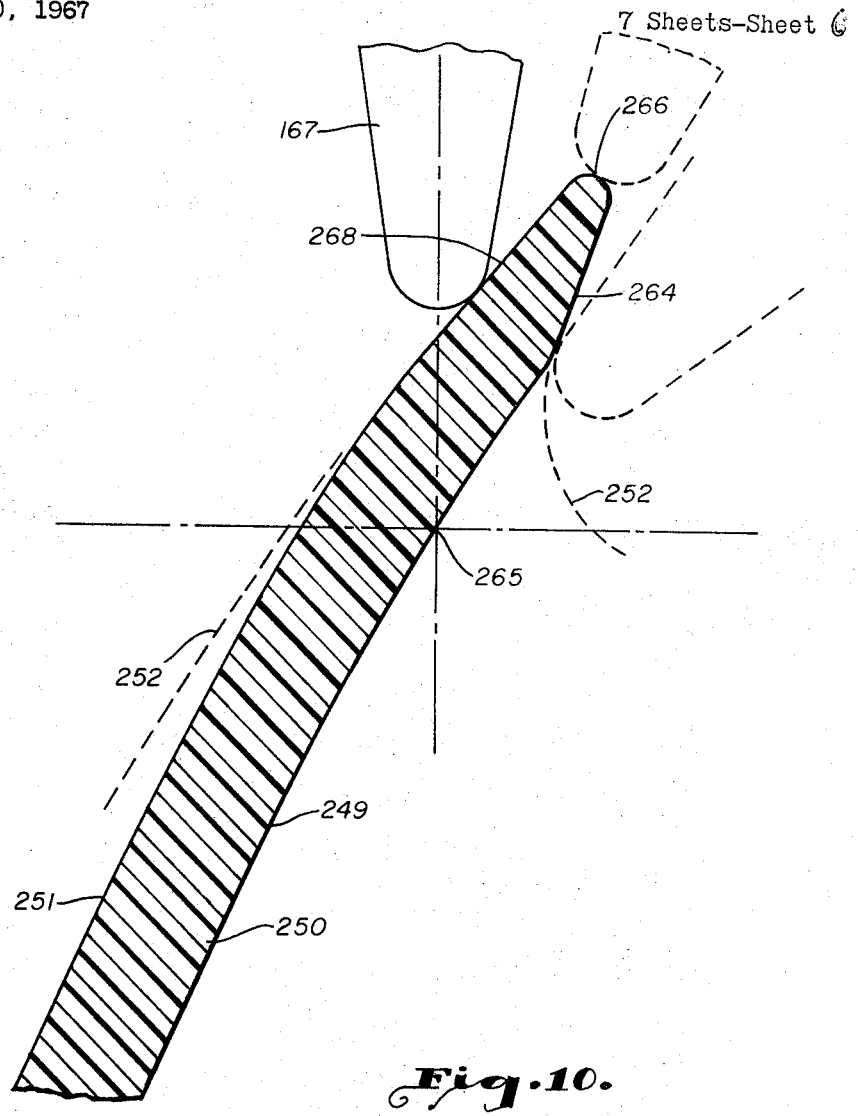
FIG. 10 is a partial sectional view of the lens edge and the path followed by the cutting tool and/or polishing mechanism.

FIG. 10 illustrates the finished lens edge design of this invention. Contact lens 250 as shown is typical of the edge shape to be superimposed upon screen 36. As is known the lens comprises inside curve 249, outside curve 251, chamfer 268, edge radius 266 and chamfer 264. The cutting tool 167 centerline intersects a horizontal centerline at point 265. The center of the tool radius follows a generated path parallel to line 252. Point 265 is the center of rotation of tool shaft 150. It should be noted that tool 167 of a fixed nose radius uses that radius to generate the lens edge shape as it sweeps therearound.

In a typical lens chamfer 264 is at a 20° angle to a line perpendicular to the centerline axis of the lens, and extends for about .0120" plus or minus .004". Thence the cutting tool is caused to generate a radius 266 which blends the surface 264 and the front convex surface 268 of the lens. The front blending occurs for approximately .25".

In the apparatus of this invention interchangeability of lens sizes is permissible since the cutting tool and the cam design 148 are oriented relative to the centerline of the lens holding and rotating assembly. Hence all angles remain the same and the cam for a given lens size will interchange without changing the cutting tool parts and without readjusting the image projection system.

LENS CENTERING TOOL

Figure 13:
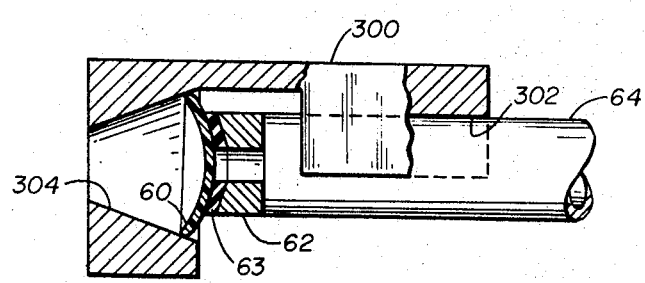
FIG. 13 is a partial sectional view of a lens centering device used in conjunction with this invention.

Referring now to FIG. 13 tool 300 includes an arcuate portion 302 adapted to rest upon spindle 64 so that conical surface 304 is continuous to lens 60 and forward thereof. Movement of the tool causes lens 60 to enter surface 304 and thus be centered relative to the axis of spindle 64.

OPERATION

The typical sequence of operation to finish the edge of a contact lens according to this invention would occur by first placing a newly sheared lens 60 on the resilient lap or lens holder 62 and the vacuum switched on. The lens is preferably positioned such that the inside radius and concave portion is directed outwardly from the lens holder. The centering tool described in FIG. 13 is positioned upon spindle 64 and pushed against the lens, causing the lens to slide around in the lap until all forces are equalized and the lens is centered with respect to the spindle. The projection light system 32 is turned on and the lens holding assembly is moved horizontally. This is accomplished by rotating shaft 117 which releases locking follower 119 allowing nut 116 to slide in the extension member 121. Hence by pushing, or pulling, knob 112 assembly 24 will slide horizontally in slot 108. Rotation of shaft 117 in the opposite direction will cause locking follower 119 to engage nut 116 and retain same from horizontal movement. Thereafter minute horizontal adjustments occur by rotation of knob 112. The lens is moved until within the graphic outline 250 of the screen 36. Vertical movement is accomplished using height adjusting lever 90 which turns nut 88 causing the bearing block 66 to move vertically until the lens edge is encompassed in the graphic outline on screen 36. The diameter of the lens is established by moving the lens edge shadow to the top position at measuring line 232 on the screen and reading dial 91. If the diameter is to be reduced lever 90 is rotated to the desired indicia. The cutting tool assembly 26 is positioned on block 136 and locked by rotation of knob 139A. The cutting tool is oriented at the top, spindle 64 rotated while assembly 24 is moved horizontally back and forth. Further changes in the lens diameter is caused by moving the lens vertically upward after each cut using lever 90 and repeating.

When the proper lens diameter has been reached, the lens edge is then centered on the screen 36 within graphic outline 250 and the cutting operation commenced. The cutting tool, by operation of hand knob 156, is preferably rotated in a counterclockwise direction whereby the cutting tool will sequentially form inner chamfer 264, end radius 266 and blending radius 268, although it is understood the operation can be reversed. When the full edge has been obtained and properly prepared with the graphic outline on screen 36, the cutting tool holder is removed and replaced with the polisher mechanism of either FIGS. 7, 8 and 9 or FIG. 12. In operation the polishing lap contacts the lens and the motor is started on a slow speed. The polisher knob 156 is caused to be rotated around the lens edge and along the front face of the lens a small distance to blend the edge radius with the normal curvature of the lens. Where longer polishing dwell time is desired or greater or lesser pressure the device of FIG. 12 is used. Thereafter the vacuum is released and the lens is removed for cleaning and inspection.

An important feature of the apparatus and lens edge design of this invention is the technique of cutting the lens with a cam-controlled single point tool in a semi-generation process. It is not analogous to a lathe operation in that the cutting tool has a nose radius of specific diameter which is a proportion related to the lever reduction of the cutting tool mechanism and the diameter and design of the cam follower. The cutting tool nose is used around its radius as it travels around the lens edge. The tool radius is in direct relation to the desired radius of the lens edge. Additionally, utilizing a cam to control the rise and fall of the tool as it rotates around the lens edge, is such that the cam is generated in a large diameter. Accordingly, using a lever reduction of ten to one allows the cam to be big, thus increasing the accuracy of the lens. All of this, in combination with the direct natural motion shadow graph and comparator projection system which detail the lens edge and the cutter at the very point of action permits the operator to see the process as it occurs in its direct relationship without inversion of the parts or processes.

The lens chuck 62 of this invention as shown in FIG. 3 is preferably of a type having a soft face and is replaceable. Resilient material such as soft rubber or polyurethane materials are suitable.

The invention has been described with reference to specific and preferred embodiments. It would be apparent, however, that other modifications can be made without departing from the spirit and the scope of the invention. For example, the invention is inclusive of structure combining the cutting tool assembly 26 and a separate polishing head assembly at spaced positions along base 20 relative to the lens holding system 24. That is, it would not be necessary to remove the cutting tool assembly and replace with the polisher assembly. Instead the holding system would be moved from one operation station to the next. Accordingly, this invention should be construed not to be limited to the embodiment herein described but should be limited only by the scope of the appended claims.

What is claimed:
1. A contact lens edging apparatus comprising a base member supporting:
    (A) a rotatable lens receiver having a resilient face against which the central portion of the outside convex contour of said lens is retained, a controllable vacuum supply and connection to said face to retain said central portion of said lens on said receiver, and means to controllably rotate said chuck;
    (B) a generating tool system oriented relative to the top marginal edge of said lens and comprising a rotatable support member, a generating tool lever arm pivotally supported to said support member about an axis transverse thereto, a generating tool attached to said arm on one side of said axis, a cam follower attached to said arm on the other side of said axis, a cam surface affixed relative to said follower, means to normally bias said arm so that said tool engages said marginal edge and said follower engages said cam surface whereby engagement therewith limits the downward movement of said generating tool depending upon the location of said rotatable support member relative to said cam design; and
    means to rotate said support member within the limits of said cam surface whereby an inside chamfer, edge radius and outside blend with the outside curvature of the lens occurs in one rotative operation.

2. Apparatus according to claim 1 wherein said generating tool system is removably oriented on said base member.

3. Apparatus according to claim 1 including:
    an optical comparator system comprising a light ray projecting system and screen wherein said light rays are caused to create an enlarged shadow upon a screen of the top portion of said lens and the end of said generating tool in direct relation and a graphic overlay of the desired marginal lens edge design upon said screen, and
    means to orient said lens receiver whereby said marginal edge shadow substantially aligns with said graphic display and to thereby allow comparative inspection of the required marginal edge of said lens and measure the diameter thereof or to generate said lens edge to the required shape.

4. Apparatus according to claim 3 wherein said beveled surface is at an angle of 20° to a line perpendicular to the centerline of said lens.

5. Apparatus according to claim 3 wherein said beveled surface is at an angle within the range of 0° to 25° to a line perpendicular to the centerline of said lens.

6. Apparatus according to claim 3 wherein said beveled surface extends for a distance of about .012" plus or minus .004".

7. Apparatus according to claim 1 including means to move and orient said lens horizontally and vertically.

8. Apparatus according to claim 1 wherein said generating tool is hand rotatable.

9. Apparatus according to claim 1 wherein said cam surface is designed such that the generating tool is caused to generate a path to form the marginal edge of said lens having a radius edge at the periphery of said lens which tangentially blends with the outside convex contour of said lens and with a straight beveled or radial surface formed in said inside concave surface adjacent said edge.

References Cited

UNITED STATES PATENTS

| 2,510,438 | 6/1950 | Tuohy | 88—54 |
| 2,688,220 | 9/1954 | Boutell | 51—235 |
| 2,990,664 | 7/1961 | Cepero | 51—235 |
| 3,015,196 | 1/1962 | Campbell | 51—284 |
| 3,079,731 | 3/1963 | Rawstron et al. | 51—58 |
| 3,160,039 | 12/1964 | Rocher et al. | 82—13 |
| 3,301,105 | 1/1967 | Morris | 82—14 |

GERALD A. DOST, Primary Examiner

U.S. Cl. X.R.

29—558; 33—28; 51—165, 235; 351—160